: US 10,808,110 B2

United States Patent
Kometani et al.

(10) Patent No.: US 10,808,110 B2
(45) Date of Patent: Oct. 20, 2020

(54) RESIN COMPOSITION, EXTRUSION-MOLDED ARTICLE, INJECTION-MOLDED ARTICLE AND BLOW-MOLDED ARTICLE

(71) Applicant: KURARAY CO., LTD., Kurashiki-shi (JP)

(72) Inventors: Eriko Kometani, Kurashiki (JP); Makoto Okamoto, Kurashiki (JP); Mitsunori Asada, Kurashiki (JP); Yaqi Li, Chiyoda-ku (JP)

(73) Assignee: Kuraray Co., Ltd., Okayama (JP)

( * ) Notice: Subject to any disclaimer, the term of this patent is extended or adjusted under 35 U.S.C. 154(b) by 0 days.

(21) Appl. No.: 16/308,925

(22) PCT Filed: Jun. 28, 2017

(86) PCT No.: PCT/JP2017/023819
§ 371 (c)(1),
(2) Date: Dec. 11, 2018

(87) PCT Pub. No.: WO2018/003884
PCT Pub. Date: Jan. 4, 2018

(65) Prior Publication Data
US 2019/0144650 A1    May 16, 2019

(30) Foreign Application Priority Data
Jun. 29, 2016    (JP) .................. 2016-129442

(51) Int. Cl.
*C08L 23/08* (2006.01)
*C08K 5/20* (2006.01)
*C08L 29/04* (2006.01)

(52) U.S. Cl.
CPC ............ *C08L 23/0861* (2013.01); *C08K 5/20* (2013.01); *C08L 29/04* (2013.01)

(58) Field of Classification Search
CPC ........ C08L 29/04; C08L 23/0861; C08K 5/20
See application file for complete search history.

(56) References Cited

U.S. PATENT DOCUMENTS

2002/0100997 A1    8/2002    Kawahara et al.
2004/0091653 A1    5/2004    Tai et al.
(Continued)

FOREIGN PATENT DOCUMENTS

EP    1 477 514 A1    11/2004
EP    1 801 154 A1    6/2007
(Continued)

OTHER PUBLICATIONS

International Search Report dated Sep. 26, 2017 in PCT/JP2017/023819 filed Jun. 28, 2017.
(Continued)

*Primary Examiner* — Mark S Kaucher
(74) *Attorney, Agent, or Firm* — Morgan, Lewis & Bockius LLP

(57) ABSTRACT

A resin composition superior in stability and external appearance characteristics during/following melt molding; and an extrusion-molded article, an injection-molded article and a blow-molded article that are formed from the resin composition are provided. The resin composition contains an ethylene-vinyl alcohol copolymer as a principle component, and has a heterogeneous nucleation index (f) of less than 0.6 as determined by formula (1) based on a differential scanning calorimetry (DSC) curve obtained by DSC in which the resin composition is cooled at a rate of 150° C./sec from a molten state at 210° C. In the formula (1), $Q_{total}$ represents an area of a total region surrounded by the DSC curve and a base line, and $Q_{hetero}$ represents an area of a heterogeneous region that is a part of the total region, falling within a range from the temperature lower than the melting point by 38° C. to a temperature lower than the melting point by 75° C.

$$f = Q_{hetero}/Q_{total} \quad (1)$$

9 Claims, 1 Drawing Sheet

(56) References Cited

U.S. PATENT DOCUMENTS

| | | | |
|---|---|---|---|
| 2007/0196679 A1* | 8/2007 | Moriyama | B32B 27/08 |
| | | | 428/518 |
| 2014/0316039 A1 | 10/2014 | Inomata et al. | |
| 2016/0221313 A1 | 8/2016 | Kawai et al. | |
| 2016/0221314 A1 | 8/2016 | Kawai | |
| 2019/0202181 A1* | 7/2019 | Hirose | C08L 29/04 |
| 2019/0202182 A1* | 7/2019 | Hirose | C08K 5/20 |
| 2019/0203005 A1* | 7/2019 | Hirose | C08J 7/042 |

FOREIGN PATENT DOCUMENTS

| | | |
|---|---|---|
| JP | 64-66262 A | 3/1989 |
| JP | 2001-146539 A | 5/2001 |
| JP | 2001-277341 A | 10/2001 |
| JP | 2002-284811 A | 10/2002 |
| JP | 2014-98169 A | 5/2014 |
| JP | 2015-71696 A | 4/2015 |
| JP | 2015-71709 A | 4/2015 |
| TW | 546314 A | 8/2003 |

OTHER PUBLICATIONS

Extended European Search Report dated Dec. 10, 2019 in Patent Application No. 17820238.8, citing documents AO and AP therein, 7 pages.

\* cited by examiner

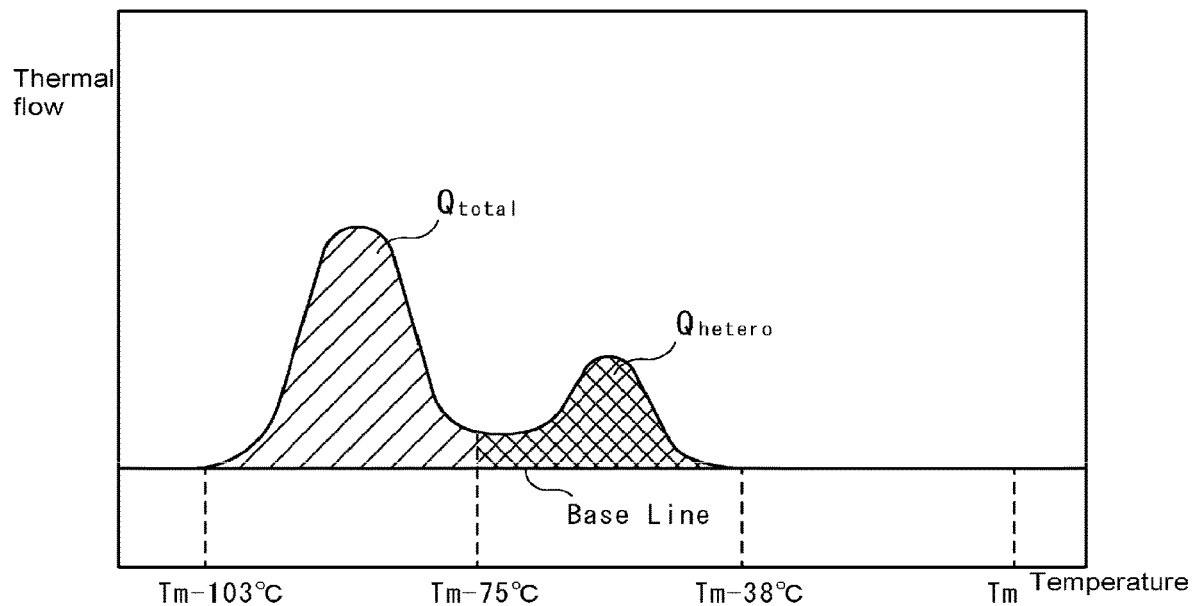

RESIN COMPOSITION, EXTRUSION-MOLDED ARTICLE, INJECTION-MOLDED ARTICLE AND BLOW-MOLDED ARTICLE

TECHNICAL FIELD

The present invention relates to a resin composition, an extrusion-molded article, an injection-molded article and a blow-molded article.

BACKGROUND ART

Ethylene-vinyl alcohol copolymers (hereinafter, may be abbreviated as EVOHs) are superior in oxygen barrier property, transparency, oil resistance, antistatic property, mechanical strength, etc., and thus are widely used as, for example, a variety of packaging materials such as films, sheets and containers. A molded product from EVOH is generally formed by using a melt molding procedure. Thus, the EVOH is desired to be superior in stability during melt molding and external appearance characteristics following melt molding (availability of a transparent product with no coloration such as yellowing).

To improve these properties which the EVOH is desired to have, in particular, the external appearance characteristics, various methods have been proposed in which an EVOH composition contains acids such as carboxylic acid and phosphoric acid and/or metal salts such as an alkali metal salt and an alkaline earth metal salt each in an appropriate content (see Japanese Unexamined Patent Application, Publication Nos. S64-66262 and 2001-146539). The EVOH compositions obtained by these methods reportedly have improved external appearance characteristics and stability during melt molding, thus being molded into products having superior external appearances. However, these compositions lead to failure in sufficiently preventing the coloration such as yellowing in melt molding, and thus further improvement has been still desired.

PRIOR ART DOCUMENTS

Patent Documents

Patent Document 1: Japanese Unexamined Patent Application, Publication No. S64-66262
Patent Document 2: Japanese Unexamined Patent Application, Publication No. 2001-146539

SUMMARY OF THE INVENTION

Problems to be Solved by the Invention

As to the higher-order structure of a crystalline polymer, observed structures when cooled down from a molten state may include: crystalline lamellae being crystals in which molecular chains align themselves in plates; stacked lamellar structures in which the crystalline lamellae and amorphous regions are alternately stacked; and spherulites in which the stacked lamellar structures have grown radially. The size and amount of the crystalline lamellae, stacked lamellar structures and spherulites to be generated vary depending on factors associated with thermodynamics and factors associated with kinetics. For example, crystal nuclei are generated at a low speed when the crystallization is allowed at a high temperature, whereas crystal nuclei are generated at a high speed when the crystallization is allowed at a low temperature. Thus, the crystallization at a high temperature results in the formation of thicker crystalline lamellae, the growth of stacked lamellar structures, and the formation of larger spherulites. To the contrary, the crystallization at a low temperature results in the formation of thinner crystalline lamellae, the inhibition of the growth of stacked lamellar structures, and the formation of smaller spherulites. Thus, the crystallization of the crystalline polymer carried out within a narrow temperature range leads to the formation of crystalline lamellae of a comparatively uniform thickness and spherulites of a comparatively uniform size. To the contrary, the crystallization carried out within a wide temperature range results in nonuniformity in the thickness of crystalline lamellae and the size of the spherulites.

The thickness of the crystalline lamellae, the size of the spherulites, and the thickness distribution and the size distribution thereof are affected by not only the crystallization conditions but also the material per se because of existing two different mechanisms, which are homogeneous nucleation (uniform nucleation) and heterogeneous nucleation (nonuniform nucleation) in the crystallization process of the crystalline polymer from the molten state. The term "homogeneous nucleation" as referred to herein means the mechanism in which crystal nuclei are generated according to a statistical probability by way of thermodynamic driving. The term "heterogeneous nucleation" as referred to herein means the mechanism in which crystal nuclei are generated through interactions of crystalline polymers with impurities and the like contained in the crystalline polymers. The crystallization associated with the heterogeneous nucleation is likely to occur at a temperature higher than the temperature at which the crystallization associated with the homogeneous nucleation occurs. Since the heterogeneous nucleation occurs due to impurities contained in the material, it is inferred that crystallization of a crystalline polymer generally proceeds with both the two mechanisms, i.e., the homogeneous nucleation and the heterogeneous nucleation in combination. In these respects, it is possible to control the growth of crystalline lamellae and spherulites of a crystalline polymer by way of materials design. For example, adding a nucleating agent to the crystalline polymer enables acceleration of the crystallization associated with the heterogeneous nucleation. It has been known that selectively inducing the crystallization associated with the heterogeneous nucleation results in the generation of a large amount of crystal nuclei in the material and the reduction in the size of spherulites, thereby enabling the transparency and the impact resistance of the material to be improved.

The thickness of crystalline lamellae, the size of spherulites, the size distribution and the density thereof, etc. greatly affect physical properties such as the hue and the melt formability of the crystalline polymer. For example, thickness nonuniformity among crystalline lamellae and/or size nonuniformity among spherulites lead(s) to also nonuniformity among the melting temperatures of the crystalline lamellae and nonuniformity among the melting temperatures of the spherulites, as given by an equation (Gibbs-Thomsom equation) expressing the relation between the melting temperature and the thermodynamically determined thickness of crystals. The nonuniformity in the melting temperature of the material is not preferred since, for example, unstable fluidity of the material in an extruder is induced.

In general, observing the crystallization behavior by a differential scanning calorimetry (DSC) during the cooling of the material from the molten state enables the thickness of crystalline lamellae, the size of spherulites, and the thickness distribution and the size distribution thereof to be evaluated. The DSC curve obtained by the DSC provides knowledge on the temperature range over which the crystallization associated with the homogeneous nucleation occurs, and on the temperature range over which the crystallization associated with the heterogeneous nucleation occurs. However, in the case of the material such as EVOH that exhibits a high crystallization speed, the crystallization occurs instantaneously, and it is thus impossible to distinguish the crystallization associated with the homogeneous nucleation from the crystallization associated with the heterogeneous nucleation on the basis of a common DSC curve. For example, even when the EVOH is cooled from the molten state to room temperature at a rate of 100° C./min, the DSC curve shows only a single peak for a signal indicative of the amount of heat released due to crystallization because of overlapping area of the amounts of heat released due to the crystallization associated with the homogeneous nucleation and with the heterogeneous nucleation. It is thus impossible to discriminate between the crystallization associated with the homogeneous nucleation and the crystallization associated with the heterogeneous nucleation at a cooling rate attainable by a common DSC device. Therefore, the relationship between an EVOH composition suited for melt molding and the crystallization behavior of the EVOH composition has been unknown.

The present invention was made in view of the foregoing circumstances, and an object of the present invention is to provide: a resin composition that is superior in stability and external appearance characteristics during/following melt molding; and an extrusion-molded article, an injection-molded article and a blow-molded article that are formed from the resin composition.

Means for Solving the Problems

The inventors found that by carrying out a differential scanning calorimetry at an extremely high cooling rate, discrimination between the crystallization associated with the homogeneous nucleation and the crystallization associated with the heterogeneous nucleation is enabled even in an EVOH composition. The inventors also found that an EVOH composition in which the crystallization associated with the heterogeneous nucleation is not predominant is superior in stability and external appearance characteristics during/following melt molding. These findings have led to the completion of the present invention.

According to an aspect of the invention made for solving the aforementioned problems, a resin composition contains an ethylene-vinyl alcohol copolymer as a principle component, the resin composition having a heterogeneous nucleation index (f) of less than 0.6 as determined by the following formula (1) based on a differential scanning calorimetry (DSC) curve obtained by DSC in which the resin composition is cooled at a rate of 150° C./sec from a molten state at 210° C.

$$f = Q_{hetero}/Q_{total} \quad (1)$$

In the formula (1): $Q_{total}$ represents an area of a total region (peak) surrounded by the DSC curve and a base line that is a straight line connecting a point indicating a thermal flow value at a temperature lower than a melting point by 38° C. and a point indicating a thermal flow value at a temperature lower than the melting point by 103° C.; and $Q_{hetero}$ represents an area of a heterogeneous region that is a part of the total region (peak), falling within a range from the temperature lower than the melting point by 38° C. to a temperature lower than the melting point by 75° C.

The term "melting point" as referred to herein means a peak top temperature at a melting peak upon heating by a general (common) DSC device at a rate of 10° C./min.

The peak of the DSC curve within the range from the temperature lower than the melting point by 38° C. to the temperature lower than the melting point by 75° C. corresponds to the amount of heat released due to the crystallization associated with the heterogeneous nucleation. The peak of the DSC curve within the range from the temperature lower than the melting point by 75° C. to the temperature lower than the melting point by 103° C. corresponds to the amount of heat released due to the crystallization associated with the homogeneous nucleation. Accordingly, the state in which the heterogeneous nucleation index (f), which represents the ratio of the amount of heat $Q_{hetero}$ released due to the crystallization associated with the heterogeneous nucleation to the amount of heat $Q_{total}$ released due to the crystallization as a whole, is less than 0.6 means that the proportion of crystals generated due to the heterogeneous nucleation is low. Thus, the resin composition is superior in stability and external appearance characteristics during/following melt molding because of uniformity in the size of crystals resulting from the lower proportion of crystals generated due to the heterogeneous nucleation.

The degree of saponification of the ethylene-vinyl alcohol copolymer is preferably 99 mol % or greater. When the EVOH having such a high degree of saponification is used, the heterogeneous nucleation index (f) of the resin composition is further reduced, thereby enabling the stability and external appearance characteristics during/following melt molding to be further improved.

The ethylene content of the ethylene-vinyl alcohol copolymer is preferably 18 mol % or greater and 55 mol % or less. When the ethylene content of the EVOH falls within the above range, the heterogeneous nucleation index (f) of the resin composition is further reduced, thereby enabling the stability and external appearance characteristics during/following melt molding to be further improved.

The content of a higher fatty acid amide with respect to the ethylene-vinyl alcohol copolymer in the resin composition is preferably 900 ppm or less. When the content of the higher fatty acid amide is 900 ppm or less, a much lower heterogeneous nucleation index (I) can be obtained, thereby enabling the stability and external appearance characteristics during/following melt molding to be further improved.

It is preferred that the resin composition contains an alkali metal salt. By virtue of the alkali metal salt contained, the thermal stability, the interlayer strength of a laminate to be formed, etc. can be improved.

The content of the alkali metal salt in terms of alkali metal element equivalent is preferably 10 ppm or greater and 500 ppm or less. When the content of the alkali metal salt falls within the above range, the heterogeneous nucleation index (f) of the resin composition can be further reduced, thereby enabling the stability and external appearance characteristics during/following melt molding to be further improved.

According to another aspect of the invention made for solving the aforementioned problems, an extrusion-molded article comprises the resin composition of the above aspect of the invention.

According to still another aspect of the invention made for solving the aforementioned problems, an injection-molded article comprises the resin composition of the above aspect of the invention.

According to a further aspect of the invention made for solving the aforementioned problems, a blow-molded article comprises the resin composition of the above aspect of the invention.

The extrusion-molded article, the injection-molded article and the blow-molded are obtained by melt molding with great stability and have superior external appearance characteristics.

Effects of the Invention

According to the aspects of the present invention, a resin composition superior in stability and external appearance characteristics during/following melt molding, and an extrusion-molded article, an injection-molded article and a blow-molded article that are formed from the resin composition are provided.

BRIEF DESCRIPTION OF THE DRAWINGS

FIG. 1 is a schematic diagram showing a DSC curve obtained by cooling a resin composition according to an embodiment of the present invention at a rate of 150° C./sec.

DESCRIPTION OF EMBODIMENTS

A resin composition, an extrusion-molded article, an injection-molded article and a blow-molded article according to each embodiment of the present invention will be described in detail with appropriate reference to the drawings.
Resin Composition The resin composition according to an embodiment of the present invention contains an EVOH as a principal component. It is to be noted that the term "principal component" as referred to herein means a component contained in the highest proportion on mass basis. The lower limit of the EVOH content of the resin composition is preferably 50% by mass, more preferably 80% by mass, still more preferably 90% by mass, even more preferably 95% by mass, further more preferably 99% by mass, and particularly preferably 99.9% by mass. Such a higher EVOH content leads to an increase in the proportion of the homogeneous nucleation. In general, besides the EVOH, intentionally added components, which will be described below, and minute quantities of unintentionally contaminating impurities are contained in the resin composition. Although the upper limit of the EVOH content of the resin composition may substantially be 100% by mass as described above, it is also preferred that an appropriate amount of additives, etc., which will be described below, is contained in the resin composition. Thus, the resin composition may also be referred to as a resin, a material, a resin material, a material for melt molding, and the like.

The resin composition has a heterogeneous nucleation index (f) of less than 0.6 as determined by the following formula (1) based on a differential scanning calorimetry (DSC) curve obtained by DSC in which the resin composition is cooled at a rate of 150° C./sec from a molten state at 210° C.

$$f = Q_{hetero}/Q_{total} \quad (1)$$

The DSC curve is schematically shown in FIG. 1. In the formula (1), $Q_{total}$ represents the area of a total region surrounded by the DSC curve and the base line that is a straight line connecting a point indicating a thermal flow value at a temperature lower than the melting point (Tm) by 38° C. and a point indicating a thermal flow value at a temperature lower than the melting point (Tm) by 103° C., and $Q_{hetero}$ represents the area of a heterogeneous region that is a part of the total region, falling within the range from a temperature lower than the melting point (Tm) by 38° C. to a temperature lower than the melting point (Tm) by 75° C. As shown in FIG. 1, a peak for a maximal thermal flow value may appear in each of the region between the temperature lower than the melting point by 38° C. and the temperature lower than the melting point by 75° C., and the region between the temperature lower than the melting point by 75° C. and the temperature lower than the melting point by 103° C. Alternatively, only one peak for a maximal thermal flow value may appear in the region between the temperature lower than the melting point (Tm) by 38° C. and the temperature lower than the melting point by 103° C. It is to be noted that the thermal flow value may also be referred to as, for example, thermal flux value.

The heterogeneous nucleation index (f) is less than 0.6, and the upper limit of the heterogeneous nucleation index (f) is preferably 0.55, and more preferably 0.51. Thus, when the amount of heat released due to the crystallization associated with the heterogeneous nucleation is small, i.e., when the proportion of the crystals formed by the heterogeneous nucleation is low, the resin composition contains crystals of uniform size, thereby leading to superior stability and external appearance characteristics during/following melt molding. Furthermore, molded articles formed from the resin composition can have sufficient impact resistance. On the other hand, the lower limit of the heterogeneous nucleation index (f) is not particularly limited, and may be 0, or may be 0.01 or 0.1. In light of the impact resistance of the molded article to be obtained, the lower limit of the heterogeneous nucleation index (f) is preferably 0.1, more preferably 0.2, and still more preferably 0.3.

The differential scanning calorimetry at a cooling rate of 150° C./sec may be carried out by using "Flash DSC 1" available from Mettler Toledo. The "Flash DSC 1" employs a system that allows a sample to be in direct contact on a sensor, and the measurement can be conducted with a sample in an amount of less than 100 ng. Thus, excellent thermal conduction between the sample and the sensor is achieved, which enables an ultrafast temperature drop. The sample piece (resin composition) to be subjected to the measurement is shaped to a plate having a length of 80 μm, a width of 80 μm and a thickness of 10 μm.

Exemplary procedures for adjusting the heterogeneous nucleation index (f) to be less than 0.6 may include:

(1) increasing the degree of saponification of the EVOH;

(2) providing the EVOH having a comparatively high ethylene content;

(3) reducing impurities by way of, for example, sufficient washing;

(4) adjusting the content of the alkali metal salt, etc., to fall within an appropriate range;

(5) adjusting the carboxylic acid content and the carboxylate ion content to fall within appropriate ranges;

(6) adjusting the content of the lubricant to fall within an appropriate range;

(7) adjusting a bath temperature for pelletization to be low;

(8) drying the pellets in a comparatively shorter period of time at a high temperature; and (9) drying the pellets in an inert gas atmosphere; and the like.

These procedures may be combined as appropriate.

An additive and/or an impurity contained in the resin composition may serve as a nucleating agent, whereby the heterogeneous nucleation is likely to be accelerated. Thus, when the content of such a component capable of serving as a nucleating agent is comparatively decreased, a lower heterogeneous nucleation index (f) can be obtained (e.g., (3) to (6)). However, in the case where a slight amount of lubricant (e.g., 50 ppm or greater and 500 ppm or less) is contained, the heterogeneous nucleation index can be lower than the heterogeneous nucleation index obtained in the case where no lubricant is contained, although the reason for this effect is not clear. Furthermore, in the process of producing a resin composition, a low molecular weight component may be generated due to, for example, heating of EVOH, and serves as a nucleating agent to accelerate the heterogeneous nucleation. Thus, when the production is carried out in an environment which is unlikely to involve heat deterioration comparatively, a lower heterogeneous nucleation index (f) can be obtained (e.g., (7) to (9)).

The following will describe the constitution and the like of the resin composition of the embodiment of the invention.

EVOH

The EVOH contained in the resin composition is a polymer including an ethylene unit (—CH$_2$—CH$_2$—) and a vinyl alcohol unit (—CH$_2$—CHOH—) as main structural units. The EVOH may include other structural unit(s) within a range not leading to impairment of the effects of the present invention.

The lower limit of the ethylene content of the EVOH (i.e., the ratio of the number of ethylene units with respect to the total number of monomer units in the EVOH) is preferably 18 mol %, more preferably 24 mol %, and still more preferably 27 mol %. On the other hand, the upper limit of the ethylene content of the EVOH is preferably 55 mol %, and still more preferably 48 mol %. When the ethylene content of the EVOH is greater than or equal to the lower limit, gas barrier property, melt formability, inhibitory ability of generation of yellowing, etc. of the molded article to be obtained under high humidity can be improved. To the contrary, when the ethylene content of the EVOH is less than or equal to the upper limit, the gas barrier property of the molded product to be obtained can be further improved.

The lower limit of the degree of saponification of the EVOH (i.e., the ratio of the number of vinyl alcohol units with respect to the total number of vinyl alcohol units and vinyl ester units in the EVOH) may be, for example, 90 mol %, and is preferably 99 mol % and more preferably 99.5 mol %. On the other hand, the upper limit of the degree of saponification of the EVOH is preferably 100 mol %, and still more preferably 99.99 mol %. When the degree of saponification of the EVOH is greater than or equal to the lower limit, a much lower heterogeneous nucleation index (f) can be obtained, thereby enabling the stability and the external appearance characteristics during/following melt molding to be improved.

Additives

The resin composition may contain additives such as a variety of acids and metal salts for enhancing each performance. Exemplary additives include an alkali metal salt, a carboxylic acid and/or a carboxylate ion, as well as a phosphoric acid compound, a boron compound, a lubricant, and the like. In some cases, it is preferred that the resin composition is free of these additives.

In light of the thermal stability, the interlayer strength of a laminate to be formed, etc., it is preferred that the resin composition contains an alkali metal ion. The lower limit of the alkali metal ion content of the resin composition in terms of alkali metal element equivalent is preferably 10 ppm, and more preferably 50 ppm. On the other hand, the upper limit thereof is preferably 500 ppm, more preferably 400 ppm, and still more preferably 300 ppm.

When the alkali metal ion content is greater than or equal to the lower limit, the addition of the alkali metal ion produces satisfactory effects. On the other hand, when the alkali metal ion content is less than or equal to the upper limit, the heterogeneous nucleation index (f) of the resin composition is sufficiently reduced, thereby enabling the stability in melt molding and the external appearance characteristics to be improved.

The procedure of adjusting the content of the alkali metal element to fall within the above range is not particularly limited. Exemplary procedures of blending the alkali metal element into the resin composition (EVOH) include: immersing the EVOH in a solution containing the alkali metal element; blending a compound containing the alkali metal element or a solution containing the alkali metal element with the EVOH in a molten state; blending a compound containing the alkali metal element with the EVOH dissolved in an appropriate solvent; and the like.

In the case of immersing the EVOH in a solution containing the alkali metal element, the concentration of the alkali metal element in the solution is not particularly limited. In light of ease in handling etc., the solvent in the solution is preferably an aqueous solution, which is not particularly limited thereto. In general, the mass of the solution into which the EVOH is to be immersed is at least 3 times greater and preferably at least 10 times greater than the mass of the EVOH in a dry state. A suitable range of the time period over which the EVOH is immersed varies by mode thereof, the immersion time period is preferably at least 1 hr, and more preferably at least 2 hrs. The immersion treatment in the solution is not particularly limited, and may be carried out in separate solutions or may be carried out at once. In light of a simplification of the process, the immersion treatment is preferably carried out at once. Also, the immersion treatment is suitably carried out in a continuous manner by using a column type device.

The resin composition may contain a carboxylic acid and/or a carboxylate ion. The carboxylic acid and the carboxylate ion produce the effect of improving the thermal stability through regulating the pH of the resin composition and preventing gelation. In the case where the resin composition contains the carboxylic acid and/or the carboxylate ion, the lower limit of the content of the carboxylic acid and the carboxylate ion is preferably 1 ppm, and more preferably 10 ppm. On the other hand, the upper limit thereof is preferably 400 ppm, more preferably 300 ppm, still more preferably 200 ppm, even more preferably 100 ppm, further more preferably 50 ppm, and particularly preferably 25 ppm. When the content of the carboxylic acid and the carboxylate ion is greater than or equal to the lower limit, the addition of the carboxylic acid and the carboxylate ion produces satisfactory effects. On the other hand, when the content is less than or equal to the upper limit, a lower heterogeneous nucleation index (f) can be obtained, thereby enabling the stability in melt molding and the external appearance characteristics to be further improved.

Examples of the carboxylic acid include succinic acid, adipic acid, benzoic acid, capric acid, lauric acid, stearic acid, glycolic acid, lauric acid, citric acid, tartaric acid, formic acid, acetic acid, propionic acid, and the like. Of these, acetic acid, propionic acid and lactic acid are preferred, acetic acid and propionic acid are more preferred, and acetic acid is still more preferred, in light of proper acidity and ease in regulating the pH of the resin composition.

The resin composition preferably has a pH of 4 or greater and 7 or less. When the pH falls outside the above range, i.e., when the resin composition is too strongly acidic or is alkaline, the EVOH may be prone to deterioration, etc., which may lead to a higher heterogeneous nucleation index (f), and accordingly to impairment of the stability in melt molding and the external appearance characteristics.

The resin composition may contain a phosphoric acid compound. The phosphoric acid compound produces the effect of improving the thermal stability and the like. The content of the phosphoric acid compound in terms of phosphoric acid radical equivalent in the resin composition may be 1 ppm or greater and 500 ppm or less. The upper limit of the content of the phosphoric acid compound in terms of phosphoric acid radical equivalent is preferably 200 ppm, more preferably 100 ppm, still more preferably 50 ppm, and particularly preferably 20 ppm. The type of the phosphoric acid compound is not particularly limited, and a variety of acids such as phosphoric acid and phosphorus acid, and salts thereof may be applicable. The phosphate may be in the form of a monophosphate salt, a diphosphate salt or a triphosphate salt, and the cationic species contained in the phosphate are not particularly limited, but alkali metal salts and alkaline earth metal salts are preferred. In particular, it is preferred that the phosphoric acid compound is contained in the form of phosphate acid, sodium dihydrogen phosphate, potassium dihydrogen phosphate, disodium hydrogen phosphate or dipotassium hydrogen phosphate, and it is more preferred that the phosphoric acid compound are added in the form of phosphoric acid, sodium dihydrogen phosphate or potassium dihydrogen phosphate.

The resin composition may contain a boron compound. The boron compound is exemplified by: boric acids such as orthoboric acid, metaboric acid and tetraboric acid; boric acid esters; boric acid salts; boron hydride compounds; and the like. Examples of the boric acid salt include alkali metal salts and alkaline earth metal salts of the aforementioned boric acids, borax, and the like. In the case where the boron compound is added, the content thereof in terms of boron element equivalent may be, for example, 20 ppm or greater and 2,000 ppm or less.

The procedure of adding the aforementioned carboxylic acid, carboxylate ion, phosphoric acid compound and boron compound is not particularly limited. For example, a procedure similar to the aforementioned procedure of blending the alkali metal element may be employed.

The lubricant enables the stability, long-run workability, external appearance characteristics, etc. during/following melt molding to be improved. Furthermore, in the case where a slight amount of the lubricant is added as mentioned above, a lower heterogeneous nucleation index (f) can be obtained.

The lubricant is not particularly limited, and may be exemplified by higher fatty acid amides, higher fatty acid metal salts (e.g., calcium stearate, etc.), low molecular weight polyolefins (e.g., low molecular weight polypropylene, low molecular weight polyethylene having a molecular weight of 500 to 10,000, etc.), and the like, which are not limited thereto. Of these, higher fatty acid amides are suitably used, and specific examples thereof include higher saturated fatty acid amides (e.g., stearic acid amide, palmitic acid amide, lauric acid amide, etc.), higher unsaturated higher fatty acid amides (e.g., oleic acid amide, erucic acid, etc.), higher bis-fatty acid amides (e.g., ethylenebis-stearic acid amide, methylenebis-stearic acid amide, etc.), and the like. It is to be noted that the higher fatty acid as referred to herein means a fatty acid having at least 6 carbon atoms, and more preferably a fatty acid having at least 10 carbon atoms. Of these, higher bis-fatty acid amides are preferred, and ethylenebis-stearic acid amides are more preferred.

The upper limit of the content of the lubricant, especially the higher fatty acid amide, with respect to the mass of the EVOH is preferably 900 ppm, more preferably 500 ppm, and still more preferably 300 ppm. On the other hand, the lower limit of the content is preferably 50 ppm, and more preferably 100 ppm. When the content of the lubricant falls within the above range, a lower heterogeneous nucleation index (f) can be obtained, thereby enabling the stability, long-run workability and external appearance characteristics, etc. during/following melt molding to be achieved.

The resin composition may contain, in addition to the additives, an appropriate amount of, for example, a plasticizer, a stabilizer, an antioxidant, a surfactant, a coloring material, a fluorescent whitening agent, an ultraviolet ray absorbing agent, an antistatic agent, a drying agent, a crosslinking agent, a metal salt other than alkali metal salts, a filler, and a reinforcing agent such as various types of fibers, within a range not leading to impairment of the effects of the present invention.

Moreover, an appropriate amount of a thermoplastic resin other than the EVOH may be blended into the resin composition, within a range not leading to impairment of the effects of the present invention. The thermoplastic resin to be used is exemplified by various types of polyolefins (e.g., polyethylene, polypropylene, poly-1-butene, poly(4-methyl-1-pentene), ethylene-propylene copolymers, copolymers of ethylene with an α-olefin having at least 4 carbon atoms, copolymers of polyolefin with maleic anhydride, ethylene-vinyl ester copolymers, ethylene-acrylic acid ester copolymers, modified polyolefins obtained by graft-modifying them with an unsaturated carboxylic acid or a derivative thereof, etc.), various types of nylons (e.g., nylon-6, nylon-6,6, nylon-6/6,6 copolymers, etc.), polyvinyl chlorides, polyvinylidene chlorides, polystyrenes, polyacrylonitriles, polyurethanes, polyacetals, modified polyvinyl alcohol resins, and the like.

In some cases, the upper limit of the content of components other than the EVOH, the alkali metal salt, the carboxylic acid, the carboxylate ion, the phosphoric acid compound, the boron compound and the lubricant in the resin composition is preferably 10,000 ppm, more preferably 1,000 ppm, and still more preferably 100 ppm. When the content of the other components is less than or equal to the upper limit, the acceleration of the heterogeneous nucleation caused by the other components serving as a nucleating agent is inhibited, and a much lower heterogeneous nucleation index (f) can be obtained.

The state of the resin composition is not particularly limited, and the resin composition may be in the form of a solution, a paste, a powder, a pellet, a film, or the like.

Production Method of Resin Composition

The resin composition may be produced by, for example, the following steps, each of which may be omitted as appropriate:

(1) a step of copolymerizing ethylene and a vinyl ester to obtain an ethylene-vinyl ester copolymer (EVAc) (polymerization step);

(2) a step of saponifying the EVAc to obtain an EVOH (saponification step);

(3) a step of obtaining pellets that contain the EVOH, from a solution or a paste containing the EVOH (pelletization step);

(4) a step of washing the pellets (washing step); and
(5) a step of drying the pellets (drying step).

(1) Polymerization Step

A copolymerization procedure of ethylene with a vinyl ester is not particularly limited, and for example, solution polymerization, suspension polymerization, emulsion polymerization, bulk polymerization, or the like may be employed. In addition, the copolymerization procedure may be either continuous or batch-wise.

Examples of the vinyl ester for use in the polymerization include fatty acid vinyl esters such as vinyl acetate, vinyl propionate and vinyl pivalate, and the like. Of these, vinyl acetate is preferred.

As the copolymer component in the polymerization, a small amount of a copolymerizable monomer other than the aforementioned components may also be copolymerized, and examples of such a copolymerizable monomer include: alkenes other than ethylene; unsaturated acids such as acrylic acid, methacrylic acid, crotonic acid, maleic acid and itaconic acid, anhydrides thereof, salts thereof, or mono- or di-alkyl ester thereof, etc.; nitriles such as acrylonitrile and methacrylonitrile; amides such as acrylamide and methacrylamide; olefin sulfonic acids such as vinylsulfonic acid, allylsulfonic acid and methallylsulfonic acid or salts thereof; alkyl vinyl ethers; vinyl ketone; N-vinylpyrrolidone; vinyl chloride; vinylidene chloride; 2-methylene-1,3-propanediol diacetate; and the like.

A vinylsilane compound may also be contained as the copolymer component. Examples of the vinylsilane compound include vinyltrimethoxysilane, vinyltriethoxysilane, vinyltri($\beta$-methoxyethoxy)silane, $\gamma$-methacryloyloxypropylmethoxysilane, and the like. Of these, vinyltrimethoxysilane and vinyltriethoxysilane are suitably used.

The solvent for use in the polymerization is not particularly limited as long as it is an organic solvent in which the ethylene, the vinyl ester and the ethylene-vinyl ester copolymer are dissolvable. Examples of the solvent to be used include alcohols such as methanol, ethanol, propanol, n-butanol and tert-butanol; dimethyl sulfoxide; and the like. Of these, methanol is particularly preferred in light of favorable removability and separability after the reaction.

Examples of the catalyst for use in the polymerization include: azonitrile initiators such as 2,2-azobisisobutyronitrile, 2,2-azobis-(2,4-dimethylvaleronitrile), 2,2-azobis-(4-methoxy-2,4-dimethylvaleronitrile) and 2,2-azobis-(2-cyclopropylpropionitrile); organic peroxide initiators such as isobutyl peroxide, cumyl peroxyneodecanoate, diisopropyl peroxycarbonate, di-n-propyl peroxydicarbonate, t-butyl peroxyneodecanoate, lauroyl peroxide, benzoyl peroxide, t-butyl hydroperoxide; and the like.

The polymerization temperature may be, for example, 20° C. or greater and 90° C. or less. The polymerization time period may be, for example, at least 2 hrs and at most 15 hrs. The rate of polymerization with respect to the amount of the vinyl ester charged may be 10% or greater and 90% or less.

In general, after the polymerization is carried out for a specified time period or a specified rate of polymerization is attained, a polymerization inhibitor is added as needed, and unreacted ethylene gas is removed by evaporation. Thereafter, unreacted vinyl ester is removed. As the procedure of removing the unreacted vinyl ester, a procedure may be adopted which involves: continuously supplying a solution of the copolymer at a constant rate from the top of a raschig ring-packed tower; blowing vapor of the organic solvent such as methanol into the tower from the bottom thereof, thereby allowing a vapor mixture of the organic solvent such as methanol and unreacted vinyl ester to be distilled off from the top of the tower; and taking out, from the bottom of the tower, the solution of the copolymer from which the unreacted vinyl ester has been removed.

(2) Saponification Step

Then, the EVAc obtained in the aforementioned step is saponified. The saponification procedure may be either continuous or batch-wise. Although the catalyst for use in the saponification is not particularly limited, alkali catalysts are preferred, examples of which include sodium hydroxide, potassium hydroxide, alkali metal alcoholate, and the like.

In the case of, for example, batch-wise saponification, the conditions may involve: the concentration of the copolymer in the solution being 10% by mass or greater and 50% by mass or less; the reaction temperature being 30° C. or greater and 60° C. or less; the amount of the catalyst used with respect to 1 mol of the vinyl ester structural unit being 0.02 mol or greater and 0.6 mol or less; and the saponification time period being at least 1 hr and at most 6 hrs.

A solution or a paste containing the EVOH is thus obtained. Since the EVOH having undergone the saponification reaction contains the alkali catalyst, by-product salts such as sodium acetate and potassium acetate, and other impurities, these are preferably removed by neutralization and washing as needed. Accordingly, a much lower heterogeneous nucleation index (f) can be obtained. In a case where the EVOH having undergone the saponification reaction is washed with water such as ion-exchange water containing almost no metal ions, chloride ions, etc., sodium acetate and potassium acetate may be partially allowed to remain.

(3) Pelletization Step

Then, the EVOH solution or the EVOH paste thus obtained are pelletized. The procedure of pelletization is not particularly limited, and is exemplified by: a procedure in which a mixed solution of alcohol and water containing the EVOH is cooled to permit coagulation, followed by cutting; a procedure in which the EVOH is melt-kneaded in an extruder and discharged therefrom, followed by cutting; and the like. Specific examples of the procedure of cutting the EVOH include: a procedure in which the EVOH is extruded into a strand form and cut with a pelletizing machine; a procedure in which the EVOH discharged from a die is cut by way of center hot cutting or underwater cutting; and the like.

In the case where the EVOH solution is extruded into a strand form for pelletization, a coagulating liquid for use in deposition is exemplified by: water; a mixed solvent of water and alcohol; aromatic hydrocarbons such as benzene; ketones such as acetone and methyl ethyl ketone; ethers such as dipropyl ether; organic esters such as methyl acetate, ethyl acetate and methyl propionate; and the like. In light of ease of handling, water or a mixed solvent of water and alcohol is preferred. Examples of the alcohol include methanol, ethanol, propanol, and the like. For industrial use, methanol is preferred. In the coagulating liquid, the mass ratio of the coagulating liquid to the EVOH strand (coagulating liquid/EVOH strand) is not particularly limited, but is preferably 50 or greater and 10,000 or less. When mass ratio falls within the above range, EVOH pellets of uniform size can be obtained.

The lower limit of the temperature at which the EVOH solution is brought into contact with the coagulating liquid (a bath temperature for pelletization) is preferably −10° C., and more preferably 0° C. On the other hand, the upper limit thereof is preferably 40° C., more preferably 20° C., still more preferably 15° C., and further preferably 10° C. When the temperature is greater than or equal to the lower limit, the deposition of a low molecular weight component is inhibited, whereby a much lower heterogeneous nucleation index (f) can be obtained. To the contrary, when the temperature is less than or equal to the upper limit, elevation of the heterogeneous nucleation index (f) caused by the heat deterioration of the EVOH can be inhibited.

The EVOH solution is extruded from a nozzle having a desired shape into a strand form in the coagulating liquid. The shape of the nozzle is not particularly limited, but is preferably cylindrical. The EVOH (solution) is thus extruded into a strand form from the nozzle. In this procedure, it is not always required that the number of the strand is one, and may be any number from several to several hundred for the extrusion.

Then, the EVOH extruded in a strand form is permitted to coagulate sufficiently before being cut and pelletized, and thereafter, the EVOH pellets are washed with water. In a case where each pellet has a circular cylindrical shape, the diameter thereof may be 1 mm or greater and 10 mm or less, and the length thereof may be 1 mm or greater and 10 mm or less. In a case where each pellet has a spherical shape, the diameter thereof may be 1 mm or greater and 10 mm or less.

(4) Washing Step

Subsequently, the EVOH pellets are washed with water in a water bath. Oligomers and impurities in the EVOH pellets are removed in the water washing treatment. The lower limit of the water temperature for water-washing is preferably 10° C., for example. On the other hand, the upper limit of the water temperature is preferably 80° C. An aqueous acetic acid solution or ion-exchange water can be used in water washing. It is preferred that water washing is eventually performed with ion-exchange water. Water washing with ion-exchange water is preferably performed at least twice, for at least 1 hr at a time. The water temperature of ion-exchange water in this treatment is preferably 5° C. or greater and 60° C. or less, and the liquor ratio is preferably 2 or greater. Thus, oligomers and impurities are sufficiently removed, and a much lower heterogeneous nucleation index (f) can be obtained.

After the washing step, the pellets may be optionally immersed in a solution containing an alkali metal, etc., as described above, so as to contain the same.

(5) Drying Step

Subsequently, the pellets are dried to obtain dry pellets of the resin composition. The lower limit of the drying time period is, for example, 3 hrs, and preferably 5 hrs. On the other hand, the upper limit of the drying time period is, for example, 100 hrs, preferably 50 hrs, and more preferably 30 hrs. It is to be noted that the drying time period for pellets herein means a time period required to reduce the moisture content of pellets to less than 0.5% by mass.

The lower limit of the drying temperature (atmosphere temperature) during the drying is preferably 100° C., more preferably 110° C., still more preferably 120° C., and particularly preferably 125° C. On the other hand, the upper limit thereof is preferably 150° C., and more preferably 140° C. When the drying temperature is greater than or equal to the lower limit, efficient and sufficient drying can be carried out, leading to reductions in the drying time period. On the other hand, when the drying temperature is less than or equal to the upper limit, heat deterioration of the EVOH can be inhibited.

The drying may be carried out in an air atmosphere, but is preferably carried out in an inert gas atmosphere. Thus, deterioration of the EVOH can be inhibited, and a lower heterogeneous nucleation index (f) can be obtained. The drying may be carried out under a reduced pressure or while permitting dehumidification. The drying procedure in the drying step is not particularly limited, and drying under ultraviolet irradiation or infrared irradiation as well as hot-air drying may be carried out.

Intended Usage

The resin composition is superior in stability and external appearance characteristics during/following melt molding. The resin composition is thus suitably used as a material for melt molding.

Molded Articles (Extrusion-Molded Article, Injection-Molded Article, Blow-Molded Article)

A molded article according to an embodiment of the present invention is a molded article comprising the resin composition. In general, the molded article may be obtained by melt molding of the resin composition. The resin composition comprised in the molded article also has a heterogeneous nucleation index (f) of less than 0.6.

The melt molding procedure for obtaining the molded product is exemplified by extrusion molding, inflation extrusion, injection molding, injection molding, blow molding, melt spinning, and the like. Of these, extrusion molding, injection molding and blow molding are preferred. When such a molding procedure is implemented, the resin composition is enabled to fully exhibit the advantage of being superior in stability and external appearance characteristics during/following melt molding. The melting temperature during melt molding is not particularly limited, but is preferably about 150° C. or greater and 300° C. or less.

The extrusion-molded article (the molded article obtained by extrusion molding of the resin composition) is not particularly limited, and examples thereof include films, sheets, tubes, pipes, fibers, containers, and the like. The films, the sheets, etc. may be monoaxially or biaxially stretched. The same applies to films, sheets, etc. obtained by other molding procedures.

The injection-molded article (the molded article obtained by injection molding of the resin composition) is not particularly limited, and examples thereof include containers sheets, caps, articles for daily use, household electrical appliances, other mechanical resin components, and the like.

The blow-molded article (the molded article obtained by blow molding of the resin composition) is not particularly limited, and examples thereof include containers, pipes, ducts, construction materials, articles for daily use, and the like.

The molded article may be composed of parts formed from the resin composition of the aforementioned embodiment, and parts formed from other material. Such a molded article is exemplified by a laminate including a layer formed from the resin composition and a layer made from the other material (e.g. a thermoplastic resin), etc. The molded article being such a laminate may be formed by, for example, coextrusion of the resin composition, the thermoplastic resin other than the resin composition, and the like. The procedure for coextrusion is exemplified by a multimanifold-merging T die process, a feed block-merging T die process, an inflation process, and the like.

EXAMPLES

Hereinafter, the embodiments of the present invention will be described in more detail by way of Examples, but the present invention is not in any way limited to these Examples.

Synthesis Example 1

(1) Synthesis of Ethylene-Vinyl Acetate Copolymer

Into a 250 L-pressurization reactor equipped with a jacket, a stirrer, a nitrogen-feeding port, an ethylene-feeding port and an initiator-adding port, 105 kg of vinyl acetate (hereinafter, also referred to as VAc) and 38.3 kg of methanol (hereinafter, also referred to as MeOH) were charged, and then were heated to 60° C. Thereafter, nitrogen replacement in the reactor was carried out for 30 min by bubbling nitrogen. Then, ethylene was introduced into the reactor so as to give the pressure (ethylene pressure) of 3.7 MPa. After regulating the temperature in the reactor to 60° C., 24.4 g of 2,2'-azobis(2,4-dimethylvaleronitrile) ("V-65" available from Wako Pure Chemical Industries, Ltd.) as an initiator was added in a methanol solution to start polymerization. During the polymerization, the ethylene pressure was maintained at 3.7 MPa and the polymerization temperature was maintained at 60° C. Four hrs later, when the rate of polymerization of VAc reached 44%, the polymerization was stopped by cooling. The reactor was opened to remove ethylene, and then a nitrogen gas was bubbled to completely remove ethylene. Then, after unreacted VAc was removed under a reduced pressure, MeOH was added to an ethylene-vinyl acetate copolymer (hereinafter, also referred to as EVAc) to obtain a 20% by mass solution in MeOH.

(2) Saponification of EVAc

Into a 500-L reactor equipped with a jacket, a stirrer, a nitrogen-feeding port, a reflux condenser and a solution-adding port, 250 kg of the 20% by mass EVAc solution in MeOH obtained in (1) was charged. While nitrogen gas was blown into the solution, the temperature of the solution was elevated to 60° C., and 4 kg of sodium hydroxide as a 2 N solution in MeOH was added. After the addition of sodium hydroxide, the mixture was stirred for 2 hrs to allow the saponification reaction to proceed while the temperature in the system was maintained at 60° C. After a lapse of 2 hrs, 4 kg of sodium hydroxide was added again in a similar manner, and the mixture was continuously stirred under heating for 2 hrs. Thereafter, 14 kg of acetic acid was added to stop the saponification reaction, and then 50 kg of ion-exchange water was added to the mixture. MeOH and water were distilled off from the reactor while the mixture was stirred under heating, whereby the reaction liquid was concentrated. After a lapse of 3 hrs, 50 kg of ion-exchange water was further added to permit deposition of an ethylene-vinyl alcohol copolymer (hereinafter, also referred to as EVOH). Thus deposited EVOH was collected by decantation, and was ground with a mixer. The EVOH powder thus obtained was charged into a 1 g/L aqueous acetic acid solution (at a liquor ratio of 20=the ratio of powder (10 kg) to ion-exchange water (200 L)), and the mixture was stirred and washed for 2 hrs. The mixture was deliquored, further charged into a 1 g/L aqueous acetic acid solution (at a liquor ratio of 20), and then stirred and washed for 2 hrs. After deliquoring, an operation including: charging the matter thus deliquored to ion-exchange water (at a liquor ratio of 20); stirring and washing the mixture for 2 hrs; and deliquoring the mixture was repeated three times to carry out purification. Then, drying was carried out for 16 hrs at 60° C. to obtain 25 kg of crude dry EVOH.

(3) Amount of Each Structural Unit in EVOH

In order to determine the structural units in the crude dry EVOH obtained in (2), 1H-NMR measurement was carried out. The crude dry EVOH obtained in (2) was dissolved in dimethyl sulfoxide (DMSO)-d6 containing tetramethylsilane as an internal standard substance and tetrafluoroacetic acid (TFA) as an additive, and was subjected to the measurement at 80° C. by using a 500 MHz 1H-NMR spectrometer ("GX-500" available from JEOL, Ltd.).

Each peak in the spectrum is assigned as follows.

0.6 to 1.9 ppm: methylene proton (4H) in the ethylene unit, methylene proton (2H) in the vinyl alcohol unit, methylene proton (2H) in the vinyl acetate unit 1.9 to 2.0 ppm: methyl proton (3H) in the vinyl acetate unit 3.1 to 4.2 ppm: methine proton (1H) in the vinyl alcohol unit The ethylene content and the degree of saponification were obtained from the peak strength ratio. The ethylene content of the crude dry EVOH obtained in (2) was 32 mol % and the degree of saponification thereof was 99% or greater.

(4) Production of Hydrous EVOH Pellets

Into a 100-L mixing vessel equipped with a jacket, a stirrer and a reflux condenser, 25 kg of the crude dry EVOH obtained in (2), 20 kg of water, and 20 g of MeOH were charged and were heated to 70° C. to permit dissolution. The solution was extruded, through a glass tube having a diameter of 3 mm, into a mixed solution of water and MeOH at a weight ratio of 90/10 cooled to 5° C., to permit deposition into a strand form. The strand was cut into pellets with a strand cutter, whereby hydrous EVOH pellets were obtained. The hydrous EVOH pellets were charged into a 1 g/L aqueous acetic acid solution (at a liquor ratio of 20), and then stirred and washed for 2 hrs. The mixture was deliquored, further charged into a 1 g/L aqueous acetic acid solution (at a liquor ratio of 20), and then stirred and washed for 2 hrs. After deliquoring, similar operations were performed with a fresh aqueous acetic acid solution. After washing with the aqueous acetic acid solution and deliquoring, an operation including: charging the matter thus deliquored into ion-exchange water (at a liquor ratio of 20); stirring and washing the mixture for 2 hrs; and deliquoring the mixture was repeated three times to carry out purification, whereby hydrous EVOH pellets were obtained from which catalyst residues left after the saponification reaction, and MeOH used to permit deposition of the strand were removed. The moisture content of the hydrous EVOH pellets thus obtained was 110% by mass as determined by using a halogen moisture meter "HR73" available from Mettler Toledo.

Synthesis Example 2

Polymerization was carried out to obtain an EVAc inn a similar manner to (1) in Synthesis Example 1 except that 44.8 kg of MeOH was used, the ethylene pressure was maintained at 3.0 MPa, and 21.7 g of initiator was used. Four hrs later, when the rate of polymerization of VAc reached 45%, the polymerization was stopped by cooling. Subsequently, the EVOH was synthesized as in Synthesis Example 1 to obtain a crude dry EVOH in which the ethylene content was 27 mol % and the degree of saponification was 99% or greater. Thereafter, hydrous EVOH pellet were obtained as in Synthesis Example 1.

Synthesis Example 3

Polymerization was carried out to obtain an EVAc in a similar manner to (1) in Synthesis Example 1 except that 25.2 kg of MeOH was used, the ethylene pressure was maintained at 5.0 MPa, and 32.2 g of initiator was used. Four hrs later, when the rate of polymerization of VAc reached 42%, the polymerization was stopped by cooling. Subsequently, the EVOH was synthesized as in Synthesis Example 1 to obtain a crude dry EVOH in which the ethylene content was 44 mol % and the degree of saponification was 99% or greater. Thereafter, hydrous EVOH pellets were obtained as in Synthesis Example 1.

Synthesis Example 4

Into a 500-L reactor equipped with a jacket, a stirrer, a nitrogen-feeding port, a reflux condenser and a solution-adding port, 250 kg of the 20% by mass EVAc solution in MeOH obtained in (1) was charged. With no nitrogen gas being blown into the solution, the temperature of the solution was elevated to 60° C., and 3 kg of sodium hydroxide as a 2 N solution in MeOH was added. After the addition of sodium hydroxide, the mixture was stirred for 0.5 hrs to allow the saponification reaction to proceed while the temperature in the system was maintained at 60° C. After a lapse of 0.5 hrs, 8 kg of acetic acid was added to stop the saponification reaction, and then 50 kg of ion-exchange water was added to the mixture. MeOH and water were distilled off from the reactor while the mixture was stirred under heating, whereby the reaction liquid was concentrated. After a lapse of 3 hrs, 50 kg of ion-exchange water was further added to permit deposition of EVOH. Thus deposited EVOH was collected by decantation, and was ground with a mixer. The EVOH powder thus obtained was charged into a 1 g/L aqueous acetic acid solution (at a liquor ratio of 20=the ratio of powder (10 kg) to ion-exchange water (200 L)), and the mixture was stirred and washed for 2 hrs. The mixture was deliquored, further charged into a 1 g/L aqueous acetic acid solution (at a liquor ratio of 20), and then stirred and washed for 2 hrs. After deliquoring, an operation including: charging the matter thus deliquored to ion-exchange water (at a liquor ratio of 20); stirring and washing the mixture for 2 hrs; and deliquoring the mixture was repeated three times to carry out purification. Then, drying was carried out for 16 hrs at 60° C. to obtain 27 kg of crude dry EVOH in which the ethylene content was 32 mol % and the degree of saponification was 98%. Thereafter, hydrous EVOH pellets were obtained as in Synthesis Example 1.

Synthesis Example 5

Hydrous EVOH pellet were obtained as in the Synthesis Example 1 except that the temperature of the mixed solution for permitting deposition of the strand in (4) of Synthesis Example 1 was set to 20° C.

Example 1

(1) Production of EVOH Composition Pellets (Resin Composition)

The hydrous EVOH pellets obtained in Synthesis Example 1 were charged into an aqueous solution (at a liquor ratio of 20) with a 0.7 g/L sodium acetate concentration, a 0.2 g/L acetic acid concentration, a 0.02 g/L phosphoric acid concentration, and a 0.3 g/L boric acid concentration, and were immersed in the solution for 4 hrs with stirring at regular intervals. The mixture was deliquored, dried in the air at 80° C. for 3 hrs, and then dried in a nitrogen atmosphere at 130° C. for 7.5 hrs. After the drying was completed, ethylenebis-stearic acid amide ("ALFLOW-H50FP" (powder; melting point: 143° C.) available from NOF CORPORATION) at a content of 250 ppm with respect to the EVOH was added as a lubricant and mixed to obtain EVOH composition pellets.

(2) Alkali Metal Content, Phosphoric Acid Compound Content, Boric Acid Content of EVOH Composition Pellets Into a Teflon (registered trademark) pressure container, 0.5 g of the EVOH composition pellets obtained in (1) were charged, and 5 mL concentrated nitric acid was added thereto, whereby the EVOH composed pellets were decomposed at room temperature for 30 min. After a lapse of 30 min, the container was covered with a lid, and a heat treatment was carried out at 150° C. for 10 min and a subsequent heat treatment was carried out at 180° C. for 5 min, by using a wet degradation device ("MWS-2" available from Actac Project Service Corporation), to permit degradation, and then the mixture was cooled to room temperature. The treatment liquid thus obtained was transferred to a 50-mL volumetric flask (TPX) and diluted with pure water to 50 mL. Metals contained in the solution were analyzed by using an ICP optical emission spectrophotometer ("OPTIMA4300DV" available from PerkinElmer Inc.), whereby the content of sodium element, the content of the phosphorus element, and the content of boron content were determined. The content of sodium salt in terms of a value of sodium element equivalent was 200 ppm, the content of phosphoric acid compound in terms of a value of phosphoric acid radical equivalent was 10 ppm, and the content of boric acid in terms of boron element equivalent was 700 ppm.

(3) Organic Acid Content of EVOH Composition Pellets

Into a 200 mL stoppered Erlenmeyer flask, 20 g of the EVOH composition pellets obtained in (1) and 100 mL of ion-exchange water were charged, and subjected to stirring extraction at 95° C. for 6 hrs in the state in which the stoppered Erlenmeyer flask was equipped with a cooling condenser. The extract thus obtained was subjected to neutralization titration performed with N/50 NaOH by using phenolphthalein as an indicator, whereby the organic acid content was quantitatively determined. The acetic acid content was 20 ppm.

(4) Measurement through Use of Flash DSC1

An EVOH composition pellet of 2 to 3 mm square was cut away with a razor, and a slice having a thickness of 10 μm was prepared by using a cutting tool such as a rotary microtome. The slice of 10 μm in thickness thus obtained was placed on a slide glass, and was trimmed by using a single-edged razor to obtain a piece having a length of 80 μm and a width of 80 μm while being observed under a microscope attached to Flash DSC1.

The slice having undergone the trimming was placed on a MultiSTAR UFS1 sensor available from Mettler Toledo through the use of a tool such as a hair pin. The MultiSTAR UFS1 sensor underwent preconditioning beforehand by the following procedure recommended by the manufacturer. To bring the slice into close contact with the sensor prior to the measurement, the EVOH composition was heated from 25° C. to 210° C. at a rate of 100° C./sec, maintained at 210° C. for 0.1 sec, and cooled to 25° C. at a rate of 100° C./sec. This operation was performed twice, and then sufficient contact of the slice with the sensor was checked. In some cases, the slice failed to be in contact with the sensor due to static electricity and the like in the course of the operation. When the failure occurred, the preparation of a slice and the subsequent steps were performed over again. After the sufficient contact of the EVOH composition slice with the sensor was checked, the crystallization of the EVOH composition was determined. Specifically, the composition was heated from 25° C. to 210° C. at a rate of 100° C./sec, maintained at 210° C. for 0.1 sec, and cooled from 210° C. to 25° C. at a rate of 150° C./sec.

(5) Analysis of DSC Chart

The DSC chart obtained by the cooling in (4) underwent a baseline process. The straight line connecting a point indicating the thermal flow value at 145° C. (the temperature lower than the melting point (183° C.) by 38° C.) and a point indicating the thermal flow value at 80° C. (the temperature lower than the melting point (183° C.) by 103° C.) was drawn, and the portion below the baseline was excluded from the DSC chart. Taking into consideration variations in the thermal flow value, the thermal flow value at 145° C. was calculated by averaging the thermal values over a temperature range of 144° C. to 146° C., and the thermal flow value at 80° C. was calculated by averaging the thermal values over a temperature range of 79° C. to 81° C. If the thermal flow value varies widely, it is impossible to determine a correct base line. In such a case, the measurement data was discarded, and the preparation of an EVOH composition slice and the subsequent steps were performed over again. After the portion below the base line was excluded, the integrated value of thermal flow changes observed over a temperature range of 145° C. to 80° C. was determined as the total amount of heat ($Q_{total}$) released due to crystallization of the EVOH composition. The integrated value of thermal flow changes observed over a temperature range of 145° C. to 108° C. (the temperature lower than the melting point (183° C.) by 75° C.) was determined as the amount of heat ($Q_{hetero}$) released due to the crystallization associated with the heterogeneous nucleation. Accordingly, the heterogeneous nucleation index (f) was calculated by the following formula, which represents the contribution of the crystallization associated with the heterogeneous nucleation.

$$f=Q_{hetero}/Q_{total}$$

To evaluate the crystallization of the EVOH composition, a series of operations including the production of an EVOH slice, the measurement through the use of Flash DSC1, and the calculation of the heterogeneous nucleation index (f) was performed at least three times. The arithmetic mean of "f"s obtained by the above operations, respectively, was determined as "f" of the EVOH composition. The f value of the EVOH composition (resin composition) obtained in Example 1 was 0.25.

(6) External Appearance Characteristics (Transparency and Coloration)

By using a heat compression pressing machine, 8 g of the EVOH composition pellets were subjected to heat melting at 220° C. for 6 min to prepare a discoid sample having a thickness of 3 mm. The transparency and the state of coloration of the discoid sample thus obtained were visually checked and evaluated in accordance with the following criteria A to C. The evaluation results were used as an indicator of the external appearance characteristics (transparency and coloration) after melt molding. The criterion B indicates the minimal level for the practical use. The results evaluated in accordance with the following criteria A to C are shown in FIG. 2.

A: Being superior in transparency and almost no coloration observed.

B: Having a slightly lower level of transparency or slight coloration observed.

C: Being opaque or deep coloration (brownness) observed.

(7) Stability during Extrusion Processing

A monolayer film was formed from the EVOH composition pellets obtained in (1) by using a 40 mm extruder "GT-40-26" available from Research Laboratory of Plastics Technology Co., Ltd. (D (mm)=40, L/D=26, compression ratio=3.2, screw: double flight) under the following conditions:

cylinder temperature: 190° C. at the feeding zone; 205° C. at the compression zone, 205° C. at the metering zone;

die temperature: 205° C.;

screw rotation speed: 60 rpm;

discharge rate: 14 to 16 kg/hr;

roll drawing temperature: 80° C.;

roll drawing speed: 3.4 to 3.7 m/min; and film thickness: 90 to 100 μm.

In a case where the EVOH composition pellets obtained in Synthesis Example 2 or Synthesis Example 3 were used in other Examples, the temperature conditions for the extruder were changed as in the following.

Conditions for Use of EVOH Composition Pellets Obtained in Synthesis Example 2 cylinder temperature: 200° C. at the feeding zone; 225° C. at the compression zone, 225° C. at the metering zone die temperature: 225° C.

Conditions for Use of EVOH Composition Pellets Obtained in Synthesis Example 3 cylinder temperature: 170° C. at the feeding zone; 195° C. at the compression zone, 195° C. at the metering zone die temperature: 195° C.

Variations in the resin pressure at the metering zone during the monolayer film formation were measured and evaluated in accordance with the following criteria A to C, and the evaluation results were used as an indicator of the stability during extrusion processing. The criterion B indicates the minimal level for the practical use. The results evaluated in accordance with the following criteria A to C are shown in FIG. 2.

A: less than +0.3 MPa

B: +0.3 MPa or greater and less than +1.0 MPa

C: ±1.0 MPa or greater (8) Production of Bottle

"HZ8200B" available from Mitsui Petrochemical Industries, Ltd. (MFR=0.01 g/10 min at 190° C. under a load of 2,160 g) was used as high density polyethylene (HDPE). "Admer GT4" available from Mitsui Chemicals Inc. (MFR=0.2 g/10 min at 190° C. under a load of 2,160 g) was used as an adhesive resin. The EVOH composition pellet prepared in Example 1 was used as a barrier material. With the extrusion temperature and the die temperature for each resin being set to 210° C. in a blow-molding machine "TB-ST-6P" manufactured by Suzuki Seiko Co., Ltd., a parison of 5 layers involving 3 types, i.e., a layered structure constitution of HDPE/adhesive resin/barrier material/adhesive resin/HDPE, was extruded, and then air was blown into the die, with cooling for 20 sec at a die temperature of 15° C., whereby a 500 mL bottle formed from the multilayer blow-molded product was obtained. The bottle had a total layer thickness of 2,175 μm and a layered structural constitution involving, from the inside to the outside, HDPE/adhesive resin/barrier material/adhesive resin/HDPE=1,000/50/75/50/1,000 μm. The bottle was successfully molded without any particular problem. The bottle had a favorable external appearance.

(9) Impact Resistance Property

Ethylene glycol accounting for 60% of the inner volume of the multilayer container obtained in (8) was charged in the container and left to stand in a freezer at −40° C. for three days. Thereafter, the container was dropped on a concrete surface to determine the drop height from which the dropped bottle was broken (to cause leakage of ethylene glycol from the container). As to the breaking height, the 50% breaking height was calculated by using the test results for n=30 in accordance with the calculation method based on the JIS test method (K7211, Section 8: Calculations). The results evaluated in accordance with the following criteria A to C are shown in FIG. 2. The criterion B indicates the minimal level for the practical use. The results evaluated in accordance with the following criteria A to C are shown in FIG. 2.

A: 5 m or greater
B: 4 in or greater and less than 5 m
C: less than 4 m

Examples 2 to 11

The hydrous EVOH pellets obtained in Synthesis Example 1 were charged into an aqueous solution containing additives such as the metal salts and organic acids shown in Table 1, and was immersed in the solution for 4 hrs with stirring at regular intervals. The mixture was deliquored, dried in the air at 80° C. for 3 hrs, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the external appearance characteristics, stability during extrusion processing and impact resistance property were evaluated. The results of the evaluations are shown in Table 2. In the tables, NaOAc designates sodium acetate, KOAc designates potassium acetate, AcOH designates acetic acid, PrOH designates propionic acid, $H_3PO_4$ designates phosphoric acid, $KH_2PO_4$ designates potassium phosphate, and $B(OH)_3$ designates boric acid. In the column of the drying atmosphere, "$N_2$" indicates drying in a nitrogen atmosphere, and "AIR" indicates drying in an air atmosphere.

For the calculation of the heterogeneous nucleation index (f), the melting point of each EVOH resin composition was used as the reference point to determine $Q_{total}$ representing the area of the total region surrounded by the DSC curve and the base line that is a straight line connecting a point indicating the thermal flow value at the temperature lower than the melting point by 38° C. and a point indicating the thermal flow value at the temperature lower the melting point by 103° C. Also, $Q_{hetero}$ was determined which represents the area of the heterogeneous region that is a part of the total region, falling within the range from the temperature lower than the melting point by 38° C. to the temperature lower than the melting point by 75° C. The same applies to Examples described below.

Example 12

The hydrous EVOH pellets obtained in Synthesis Example 2 were charged into an aqueous solution containing additives such as the metal salts and organic acids shown in Table 1, and was immersed in the solution for 4 hrs with stirring at regular intervals. The mixture was deliquored, dried in the air at 80° C. for 3 hrs, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the external appearance characteristics, stability during extrusion processing and impact resistance property were evaluated. The results of the evaluations are shown in Table 2.

Example 13

The hydrous EVOH pellets obtained in Synthesis Example 3 were charged into an aqueous solution containing additives such as the metal salts and organic acids shown in Table 1, and was immersed in the solution for 4 hrs with stirring at regular intervals. The mixture was deliquored, dried in the air at 80° C. for 3 hrs, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the external appearance characteristics, stability during extrusion processing and impact resistance property were evaluated. The results of the evaluations are shown in Table 2.

Comparative Examples 1 to 7

The hydrous EVOH pellets obtained in Synthesis Example 1 were charged into an aqueous solution containing additives such as the metal salts and organic acids shown in Table 1, and was immersed in the solution for 4 hrs with stirring at regular intervals. The mixture was deliquored, dried in the air at 80° C. for 3 hrs, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the external appearance characteristics, stability during extrusion processing and impact resistance property were evaluated. The results of the evaluations are shown in Table 2.

Comparative Example 8

The hydrous EVOH pellets obtained in Synthesis Example 2 were charged into an aqueous solution containing additives such as the metal salts and organic acids shown in Table 1, and were immersed in the solution for 4 hrs with stirring at regular intervals. The mixture was deliquored, dried in the air at 80° C. for 3 hrs, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the external appearance characteristic, stability during extrusion processing and impact resistance property were evaluated. The results of the evaluations are shown in Table 2.

Comparative Example 9

The hydrous EVOH pellets obtained in Synthesis Example 4 were charged into an aqueous solution containing additives such as the metal salts and organic acids shown in Table 1, and were immersed in the solution for 4 hrs with stirring at regular intervals. The mixture was deliquored, dried in the air at 80° C. for 3 hrs, and then dried under the conditions shown in Table 1. After the drying was completed, the lubricant was mixed under the conditions shown in Table 2 in a manner similar to that of Example 1, whereby EVOH composition pellet were obtained. As in Example 1, the resin was analyzed, and the external appearance characteristics, stability during extrusion processing and impact resistance property were evaluated. The results of the evaluations are shown in Table 2.

Comparative Example 10

The hydrous EVOH pellets obtained in Synthesis Example 5 were charged into an aqueous solution containing additives such as the metal salts and organic acids shown in Table 1, and were immersed in the solution for 4 hrs with stirring at regular intervals. The mixture was deliquored, dried in the air at 80° C. for 3 hrs, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the external appearance characteristics, stability during extrusion processing and impact resistance property were evaluated. The results of the evaluations are shown in Table 2.

TABLE 1

| | Hydrous EVOH Pellet Used | Ethylene Content (mol %) | Degree of Saponification (mol %) | NaOAc g/L | KOAc g/L | AcOH g/L | PrOH g/L | $H_3PO_4$ g/L | $KH_2PO_4$ g/L | $B(OH)_3$ g/L | Temperature (° C.) | Time Period (hr) | Drying Atmosphere |
|---|---|---|---|---|---|---|---|---|---|---|---|---|---|
| | | | | \multicolumn{7}{c}{Concentration of Each Additive in Aqueous Solution Used for Treating Hydrous EVOH Pellets before Drying} | | \multicolumn{3}{c}{Drying Conditions} | | |
| Example 1 | Synthesis Example 1 | 32 | 99 or greater | 0.7 | 0.0 | 0.2 | 0.0 | 0.02 | 0.0 | 0.3 | 130 | 75 | $N_2$ |
| Example 2 | Synthesis Example 1 | 32 | 99 or greater | 0.0 | 0.0 | 0.0 | 0.0 | 0.0 | 0.1 | 0.4 | 120 | 15 | Air |
| Example 3 | Synthesis Example 1 | 32 | 99 or greater | 0.7 | 0.0 | 0.2 | 0.0 | 0.02 | 0.0 | 0.4 | 120 | 15 | Air |
| Example 4 | Synthesis Example 1 | 32 | 99 or greater | 0.7 | 0.0 | 0.2 | 0.0 | 0.02 | 0.0 | 0.4 | 120 | 15 | $N_2$ |
| Example 5 | Synthesis Example 1 | 32 | 99 or greater | 0.7 | 0.0 | 0.7 | 0.0 | 0.03 | 0.0 | 0.4 | 120 | 15 | Air |
| Example 6 | Synthesis Example 1 | 32 | 99 or greater | 0.2 | 0.0 | 0.0 | 0.0 | 0.07 | 0.0 | 0.4 | 120 | 15 | $N_2$ |
| Example 7 | Synthesis Example 1 | 32 | 99 or greater | 0.7 | 0.0 | 0.5 | 0.0 | 0.02 | 0.0 | 0.4 | 120 | 15 | $N_2$ |
| Example 8 | Synthesis Example 1 | 32 | 99 or greater | 0.6 | 0.0 | 0.5 | 0.0 | 0.02 | 0.0 | 0.4 | 120 | 15 | $N_2$ |
| Example 9 | Synthesis Example 1 | 32 | 99 or greater | 1.2 | 0.0 | 0.0 | 0.6 | 0.02 | 0.0 | 0.4 | 120 | 15 | $N_2$ |
| Example 10 | Synthesis Example 1 | 32 | 99 or greater | 1.6 | 0.0 | 0.5 | 0.0 | 0.02 | 0.0 | 0.4 | 120 | 15 | $N_2$ |
| Example 11 | Synthesis Example 1 | 32 | 99 or greater | 0.7 | 0.0 | 0.2 | 0.0 | 0.02 | 0.0 | 0.3 | 130 | 7.5 | $N_2$ |
| Example 12 | Synthesis Example 2 | 27 | 99 or greater | 0.7 | 0.0 | 0.2 | 0.0 | 0.00 | 0.0 | 0.3 | 120 | 15 | $N_2$ |
| Example 13 | Synthesis Example 3 | 44 | 99 or greater | 0.4 | 0.0 | 0.5 | 0.0 | 0.06 | 0.0 | 0.0 | 110 | 20 | Air |
| Comparative Example 1 | Synthesis Example 1 | 32 | 99 or greater | 0.6 | 0.0 | 0.5 | 0.0 | 0.02 | 0.0 | 0.4 | 120 | 15 | $N_2$ |
| Comparative Example 2 | Synthesis Example 1 | 32 | 99 or greater | 0.6 | 0.0 | 0.5 | 0.0 | 0.02 | 0.0 | 0.4 | 110 | 20 | Air |
| Comparative Example 3 | Synthesis Example 1 | 32 | 99 or greater | 0.6 | 0.0 | 0.8 | 0.0 | 0.02 | 0.0 | 0.4 | 120 | 15 | $N_2$ |
| Comparative Example 4 | Synthesis Example 1 | 32 | 99 or greater | 0.7 | 0.0 | 0.2 | 0.0 | 0.02 | 0.0 | 0.4 | 100 | 40 | Air |
| Comparative Example 5 | Synthesis Example 1 | 32 | 99 or greater | 0.7 | 0.0 | 0.0 | 0.2 | 0.00 | 0.0 | 0.4 | 105 | 24 | $N_2$ |
| Comparative Example 6 | Synthesis Example 1 | 32 | 99 or greater | 0.7 | 0.0 | 0.3 | 0.0 | 0.02 | 0.0 | 0.4 | 130 | 7.5 | Air |
| Comparative Example 7 | Synthesis Example 1 | 32 | 99 or greater | 0.6 | 0.0 | 0.5 | 0.0 | 0.02 | 0.0 | 0.4 | 120 | 15 | $N_2$ |
| Comparative Example 8 | Synthesis Example 2 | 27 | 99 or greater | 0.6 | 0.0 | 0.5 | 0.0 | 0.02 | 0.0 | 0.4 | 110 | 20 | Air |
| Comparative Example 9 | Synthesis Example 4 | 32 | 98 | 0.6 | 0.0 | 0.5 | 0.0 | 0.02 | 0.0 | 0.4 | 120 | 15 | $N_2$ |
| Comparative Example 10 | Synthesis Example 5 | 32 | 99 or greater | 0.7 | 0.0 | 0.2 | 0.0 | 0.02 | 0.0 | 0.3 | 130 | 7.5 | $N_2$ |

TABLE 2

| | Ethylene Content (mol %) | Degree of Saponification (mol %) | Na (ppm) | K (ppm) | AcOH (ppm) | PrOH (ppm) | Phosphate Compound (ppm) | $B(OH)_3$ (ppm) | Content of Lubricant (ppm) | f | External Appearance Characteristics | Stability during Extrusion Molding | Impact Resistance Property |
|---|---|---|---|---|---|---|---|---|---|---|---|---|---|
| Example 1 | 32 | 99 or greater | 200 | 0 | 20 | 0 | 10 | 700 | 250 | 0.25 | A | A | B |
| Example 2 | 32 | 99 or greater | 0 | 130 | 0 | 0 | 60 | 940 | 100 | 0.37 | A | A | A |
| Example 3 | 32 | 99 or greater | 200 | 0 | 30 | 0 | 10 | 680 | 100 | 0.42 | B | A | A |
| Example 4 | 32 | 99 or greater | 200 | 0 | 35 | 0 | 10 | 760 | 100 | 0.35 | A | A | A |

TABLE 2-continued

| | Ethylene Content (mol %) | Degree of Saponification (mol %) | Content in EVOH Composition Pellet | | | | | | Content of Lubricant (ppm) | f | External Appearance Characteristics | Stability during Extrusion Molding | Impact Resistance Property |
|---|---|---|---|---|---|---|---|---|---|---|---|---|---|
| | | | Na (ppm) | K (ppm) | AcOH (ppm) | PrOH (ppm) | Phosphate Compound (ppm) | B(OH)$_3$ (ppm) | | | | | |
| Example 5 | 32 | 99 or greater | 190 | 0 | 450 | 0 | 15 | 680 | 100 | 0.51 | B | A | A |
| Example 6 | 32 | 99 or greater | 66 | 0 | 0 | 0 | 40 | 700 | 100 | 0.35 | A | A | A |
| Example 7 | 32 | 99 or greater | 200 | 0 | 280 | 0 | 12 | 760 | 100 | 0.36 | A | A | A |
| Example 8 | 32 | 99 or greater | 160 | 0 | 350 | 0 | 12 | 770 | 100 | 0.43 | A | A | A |
| Example 9 | 32 | 99 or greater | 350 | 0 | 0 | 250 | 10 | 700 | 250 | 0.45 | B | A | A |
| Example 10 | 32 | 99 or greater | 450 | 0 | 310 | 0 | 10 | 700 | 250 | 0.38 | B | A | A |
| Example 11 | 32 | 99 or greater | 200 | 0 | 20 | 0 | 10 | 700 | 0 | 0.47 | A | B | B |
| Example 12 | 27 | 99 or greater | 200 | 0 | 40 | 0 | 1 | 800 | 250 | 0.44 | B | B | B |
| Example 13 | 44 | 99 or greater | 100 | 0 | 250 | 0 | 35 | 0 | 200 | 0.51 | A | A | A |
| Comparative Example 1 | 32 | 99 or greater | 160 | 0 | 350 | 0 | 12 | 780 | 1000 | 0.65 | A | C | B |
| Comparative Example 2 | 32 | 99 or greater | 160 | 0 | 360 | 0 | 10 | 770 | 200 | 0.68 | A | C | B |
| Comparative Example 3 | 32 | 99 or greater | 160 | 0 | 510 | 0 | 10 | 940 | 250 | 0.74 | A | C | B |
| Comparative Example 4 | 32 | 99 or greater | 200 | 0 | 20 | 0 | 10 | 700 | 250 | 0.82 | C | B | B |
| Comparative Example 5 | 32 | 99 or greater | 200 | 0 | 0 | 25 | 0 | 710 | 200 | 0.84 | C | C | C |
| Comparative Example 6 | 32 | 99 or greater | 200 | 0 | 20 | 0 | 10 | 700 | 250 | 0.85 | C | C | C |
| Comparative Example 7 | 32 | 99 or greeter | 160 | 0 | 350 | 0 | 12 | 770 | 0 | 0.62 | B | C | A |
| Comparative Example 8 | 27 | 99 or greater | 160 | 0 | 300 | 0 | 13 | 810 | 200 | 0.77 | B | C | C |
| Comparative Example 9 | 32 | 98 | 180 | 0 | 300 | 0 | 10 | 750 | 250 | 0.80 | C | C | B |
| Comparative Example 10 | 32 | 99 or greater | 200 | 0 | 20 | 0 | 10 | 700 | 250 | 0.61 | C | B | A |

As shown in Table 2, the EVOH pellets (resin compositions) of Examples 1 to 13 having an f value of less than 0.6 exhibited favorable results in terms of external characteristics, stability during extrusion processing and impact resistance property. On the other hand, the external appearance characteristics and the stability during extrusion processing of the EVOH pellets (resin compositions) of Comparative Examples 1 to 11 having an f value of 0.6 or greater failed to reach the minimal level for the practical use.

Main factors responsible for the f value being 0.6 or greater in Comparative Examples 1 to 10 are as follows.

Comparative Example 1

A large amount of the lubricant contained.

Comparative Example 2

Drying carried out in an air atmosphere for a comparatively long period of time, with a comparatively large amount of the organic acid contained.

Comparative Example 3

A large amount of the organic acid contained.

Comparative Example 4

Drying carried out in an air atmosphere for a long period of time.

Comparative Example 5

Drying carried out for a long period of time.

Comparative Example 6

Drying carried out in an air atmosphere, with a comparatively large amount of the lubricant contained.

Comparative Example 7

A comparatively large amount of the organic acid contained, without adding a lubricant.

Comparative Example 8

Drying carried out in an air atmosphere, with a comparatively large amount of the organic acid contained, and the ethylene content of the EVOH being comparatively low.

Comparative Example 9

The degree of saponification of the EVOH being low.

Comparative Example 10

The bath temperature for pelletization being comparatively high.

On the other hand, Examples 1 to 13 reveal that appropriate control of the degree of saponification and the ethylene content of the EVOH, the amount of additives, the drying conditions, and the like enables the EVOH composition pellet (resin composition) having the f value of less than 0.6 to be obtained.

INDUSTRIAL APPLICABILITY

The resin composition according to the present invention can be suitably used as a material for melt molding of films, sheets, containers, pipes, fibers and the like.

The invention claimed is:

1. A resin composition, comprising an ethylene-vinyl alcohol copolymer as a principal component,
the resin composition having a heterogeneous nucleation index (f) of less than 0.6 as determined by formula (1) based on a differential scanning calorimetry (DSC) curve obtained by DSC, wherein the resin composition is cooled at a rate of 150° C./sec from a molten state at 210° C., $$f = Q_{hetero}/Q_{total} \quad (1)$$

wherein,
$Q_{total}$ represents an area of a total region surrounded by the DSC curve and a base line that is a straight line connecting a point indicating a thermal flow value at a temperature lower than a melting point by 38° C. and a point indicating a thermal flow value at a temperature lower than the melting point by 103° C., and
$Q_{hetero}$ represents an area of a heterogeneous region that is a part of the total region, within a range from the temperature lower than the melting point by 38° C. to a temperature lower than the melting point by 75° C.

2. The resin composition of claim 1, wherein a degree of saponification of the ethylene-vinyl alcohol copolymer is 99 mol % or greater.

3. The resin composition of claim 1, wherein an ethylene content of the ethylene-vinyl alcohol copolymer is 18 mol % or greater and 55 mol % or less.

4. The resin composition of claim 1, wherein a content of a higher fatty acid amide with respect to the ethylene-vinyl alcohol copolymer is 900 ppm or less.

5. The resin composition of claim 1, further comprising an alkali metal salt.

6. The resin composition of claim 5, wherein a content of the alkali metal salt in terms of alkali metal element equivalent is 10 ppm or greater and 500 ppm or less.

7. An extrusion-molded article, comprising the resin composition of claim 1.

8. An injection-molded article, comprising the resin composition of claim 1.

9. A blow-molded article, comprising the resin composition of claim 1.

* * * * *